United States Patent
Nordbruch et al.

(10) Patent No.: US 10,474,156 B2
(45) Date of Patent: Nov. 12, 2019

(54) METHOD AND SYSTEM FOR ASCERTAINING DATA FOR AN AUTONOMOUS DRIVING OPERATION OF A MOTOR VEHICLE

(71) Applicant: Robert Bosch GmbH, Stuttgart (DE)

(72) Inventors: Stefan Nordbruch, Kornwestheim (DE); Gerrit Quast, Nuertingen (DE); Juergen Auracher, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 198 days.

(21) Appl. No.: 15/407,408

(22) Filed: Jan. 17, 2017

(65) Prior Publication Data

US 2017/0212519 A1    Jul. 27, 2017

(30) Foreign Application Priority Data

Jan. 21, 2016 (DE) .......... 10 2016 200 792

(51) Int. Cl.

| | |
|---|---|
| *G05D 1/00* | (2006.01) |
| *G05D 1/02* | (2006.01) |
| *G08G 1/14* | (2006.01) |
| *B62D 15/02* | (2006.01) |
| *B60W 30/06* | (2006.01) |

(Continued)

(52) U.S. Cl.
CPC .......... *G05D 1/0221* (2013.01); *B60W 30/06* (2013.01); *B62D 15/02* (2013.01); *B62D 15/027* (2013.01); *B62D 15/0285* (2013.01); *G05D 1/0088* (2013.01); *G05D 1/0212* (2013.01); *G05D 1/0231* (2013.01); *G05D 1/0257* (2013.01); *G08G 1/04* (2013.01); *G08G 1/14* (2013.01);

(Continued)

(58) Field of Classification Search
CPC .. G05D 1/0221; G05D 1/0257; G05D 1/0088; G05D 1/0212; G05D 1/0231; G08G 1/14
See application file for complete search history.

(56) References Cited

U.S. PATENT DOCUMENTS

2013/0321582 A1* 12/2013 Huang ................. G01B 11/303
                                                                 348/46
2014/0180523 A1*  6/2014 Reichel .............. B62D 15/0285
                                                                 701/23

(Continued)

FOREIGN PATENT DOCUMENTS

DE    102013015348 A1    4/2014
DE    102012025317 A1    6/2014

(Continued)

*Primary Examiner* — Alan D Hutchinson
(74) *Attorney, Agent, or Firm* — Norton Rose Fulbright US LLP; Gerard Messina (57) ABSTRACT

A method for ascertaining data for an autonomous driving operation of a motor vehicle within a parking facility using one or multiple surroundings sensor system(s). The method includes detecting present surroundings of the motor vehicle during a manually guided trip of the motor vehicle within the parking facility with the aid of the surroundings sensor system(s) to ascertain the surroundings data corresponding to the surroundings, and ascertaining the data for an autonomous driving operation of the motor vehicle within the parking facility based on the surroundings data so that the motor vehicle may autonomously drive within the parking facility based on the ascertained data.

23 Claims, 3 Drawing Sheets

(51) Int. Cl.
 *G08G 1/04* (2006.01)
 *G08G 1/16* (2006.01)
(52) U.S. Cl.
 CPC ......... *G08G 1/168* (2013.01); *B60W 2530/14* (2013.01); *G05D 2201/0213* (2013.01)

(56) References Cited

U.S. PATENT DOCUMENTS

| | | | |
|---|---|---|---|
| 2014/0375804 A1 | 12/2014 | Bulan et al. | |
| 2017/0254654 A1* | 9/2017 | Nordbruch | B62D 15/0285 |
| 2017/0284810 A1* | 10/2017 | Altinger | G01C 21/206 |
| 2017/0297625 A1* | 10/2017 | Irion | B60W 30/06 |
| 2017/0313305 A1* | 11/2017 | Irion | B60W 30/06 |
| 2017/0313307 A1* | 11/2017 | Nordbruch | G05D 1/0212 |
| 2018/0237069 A1* | 8/2018 | Gehin | B62D 15/0285 |

FOREIGN PATENT DOCUMENTS

| | | | |
|---|---|---|---|
| DE | 102012222562 A1 | 6/2014 | |
| DE | 102014220144 A1 | 4/2016 | |

\* cited by examiner

METHOD AND SYSTEM FOR ASCERTAINING DATA FOR AN AUTONOMOUS DRIVING OPERATION OF A MOTOR VEHICLE

CROSS REFERENCE

The present application claims the benefit under 35 U.S.C. § 119 of German Patent Application No. DE 102016200792.0 filed on Jan. 21, 2016, which is expressly incorporated herein by reference in its entirety.

FIELD

The present invention relates to a method and a system for ascertaining data for an autonomous driving operation of a motor vehicle within a parking facility using one or multiple surroundings sensor system(s). The present invention additionally relates to a motor vehicle, a parking facility, and a computer program.

BACKGROUND INFORMATION

A system for managed parking facilities for transferring a vehicle from a starting position into a target position is described in German Patent Application No. DE 10 2012 222 562 A1. Data, based on which the vehicle is transferred, are required for such a transfer.

SUMMARY

An object of the present invention is to efficiently ascertain data for an autonomous driving operation of a motor vehicle within a parking facility.

This object is achieved with the aid of the embodiments of the present invention. Advantageous embodiments of the present invention are described herein.

According to one aspect, a method for ascertaining data for an autonomous driving operation of a motor vehicle within a parking facility using one or multiple surroundings sensor system(s) is provided, including the following steps:
  detecting present surroundings of the motor vehicle during a manually guided trip of the motor vehicle within the parking facility with the aid of the surroundings sensor system(s) to ascertain surroundings data corresponding to the detected surroundings, and
  ascertaining the data for an autonomous driving operation of the motor vehicle within the parking facility based on the surroundings data so that the motor vehicle may autonomously drive within the parking facility based on the ascertained data.

According to yet another aspect, a system is provided for ascertaining data for an autonomous driving operation of a motor vehicle within a parking facility using one or multiple surroundings sensor system(s), including:
  one or multiple surroundings sensor system(s) for detecting present surroundings of the motor vehicle during a manually guided trip of the motor vehicle within the parking facility to ascertain surroundings data corresponding to the detected surroundings, and
  a processing unit for ascertaining the data for an autonomous driving operation of the motor vehicle within the parking facility based on the ascertained surroundings data so that the motor vehicle may autonomously drive within the parking facility based on the ascertained data.

According to another aspect, a motor vehicle is provided including the system according to the present invention.

According to yet another aspect, a parking facility for motor vehicles is provided including the system according to the present invention.

According to yet another aspect, a computer program is provided which includes program code for carrying out the method according to the present invention when the computer program is executed by a computer.

The present invention thus includes in particular and among other things, detecting surroundings of the motor vehicle during its manually guided trip within a parking facility with the aid of one or multiple surroundings sensor system(s). Corresponding surroundings data are ascertained according to the detected surroundings. The data are then ascertained based on the surroundings data. Thus, within the scope of a manually guided trip, those data are efficiently ascertained which are necessary so that the motor vehicle may drive without a driver, i.e., autonomously, within the parking facility.

Each driver of the motor vehicle according to the present invention or each driver who drives with a motor vehicle within the parking facility according to the present invention is thus advantageously placed in a position to ascertain these data or to take part in it. This, in particular, when the driver uses the motor vehicle according to the present invention to compile the data. All that is required for this is a surroundings sensor system and a corresponding processing unit. In general, however, motor vehicles are already equipped with one or multiple surroundings sensor system(s). Thus, a driver of the motor vehicle becomes advantageously independent of external service providers who, in general, ascertain such data, for example digital maps of parking facilities, for individual parking facilities. Thus, for example, the driver of the motor vehicle may himself ascertain such data, for example, a digital map of a parking facility, for which there is as yet no digital map, nor, in general, any such data. This is thus, in particular, advantageous when the parking facility is a private parking facility, for which, in general, no digital map is yet available, in general, no such data are yet available. In general, such data, in particular digital maps for parking facilities, are only compiled for public parking facilities. However, this is not guaranteed in all cases for public parking facilities. In general, this means a large expense to ascertain such data, for example, digital maps, so that this is only worthwhile for external service providers for large parking facilities.

A parking facility within the sense of the present invention may also be designated as a parking area and is used as a parking location for motor vehicles. The parking facility thus forms in particular a contiguous area that has multiple parking positions (with respect to a parking facility on private property) or parking positions (with respect to a parking facility on public property). The parking facility is designed as a parking deck according to one specific embodiment. According to one specific embodiment, the parking facility is designed as a parking garage.

The expression "digital map" is used in particular as an example for data that are to be ascertained. This means, that when using the expression "digital map," the general case of "data" is also to be read.

Data, which are ascertained within the scope of this present invention, are thus data which are suited so that a motor vehicle may autonomously drive based on these data. Autonomously means that the motor vehicle is no longer manually steered or guided by a driver. In the context of autonomous driving, the motor vehicle drives, for example, autonomously or is remote controlled.

Thus, the driver of the motor vehicle may compile a digital map of a public and/or a private parking facility. Based on the compiled digital map, it is advantageously facilitated that the motor vehicle drives autonomously or by remote control within the parking facility. In particular, efficient navigation within the parking facility is facilitated based on such a compiled digital map of the parking facility. Thus, for example, the driver may manually navigate the motor vehicle in an advantageous way within the parking facility based on the digital map. Furthermore, it is advantageously facilitated that the driver may navigate as a pedestrian within the parking facility based on the digital map. For example, the driver may upload the compiled digital map of the parking facility on his mobile terminal and thus navigate and orient himself within the parking facility.

It is provided in one specific embodiment that, based on the surroundings data, it is checked whether the surroundings corresponding to the surroundings data have to be detected once again with the aid of the surroundings sensor system(s), if the check revealed that the surroundings corresponding to the surroundings data have to be detected once again with the aid of the surroundings sensor system(s), a driving instruction is ascertained for a driver of the motor vehicle to detect the surroundings once again with the aid of the surroundings sensor system(s) during a trip of the motor vehicle corresponding to the ascertained driving instruction, the driving instruction being provided to the driver of the motor vehicle with the aid of a human-machine interface.

Thus, the technical advantage is yielded in particular that errors during ascertainment of the data may be efficiently prevented. If the check revealed that the corresponding surroundings have to be detected once again, then a driving instruction is ascertained for the driver of the motor vehicle so that, based on the driving instruction, he or she may drive through these surroundings once again. Thus, it is ensured in an advantageous way that the surroundings are detected once again with the aid of the surroundings sensor system and correspondingly exact surroundings data are provided for ascertaining the data.

The driving instruction, for example, specifies a driving maneuver that, when carried out, leads to a repeated driving past the originally detected surroundings.

Thus, for example, the check may have revealed that a specific area of the surroundings was not sufficiently detected with the aid of the surroundings sensor system(s) in order to be able to compile the data for this area. Due to the repeated driving past the area(s) and due to the repeated detecting of the area with the aid of the surroundings sensor system(s), it may be ensured in an advantageous way that this area may be efficiently detected during the repeated driving past, so that ultimately the data may be efficiently and exactly ascertained.

A human-machine interface within the sense of the present invention refers in particular to a user interface or to a user interface between the system and a driver of the motor vehicle.

A human-machine interface includes, according to one specific embodiment, a display device, for example a screen, for example a touch-sensitive screen also known as a touch screen.

According to one specific embodiment, the human-machine interface includes a loudspeaker and optionally preferably also additionally a microphone.

A surroundings sensor system within the sense of the present invention includes, for example, one or multiple surroundings sensor(s). A surroundings sensor within the sense of the present invention is in particular one of the following surroundings sensors: video sensor, radar sensor, ultrasonic sensor, infrared sensor, laser sensor, LIDAR sensor, or magnetic sensor. An efficient detection of surroundings of the motor vehicle is facilitated in an advantageous way with the aid of a surroundings sensor. The data, ascertained with the aid of the surroundings sensor, which correspond to the detected surroundings, may be referred to as sensor data or surroundings sensor data. The surroundings data correspond to the sensor data according to one specific embodiment. According to one specific embodiment, the surroundings data are ascertained based on the sensor data. Thus, for example, it is provided according to a specific embodiment that the sensor data are merged with one another in order to ascertain the surroundings data.

It is provided according to one specific embodiment that the ascertainment of the data includes that the detected surroundings data are analyzed for potential parking positions for the motor vehicle, so that the ascertained data include located potential parking positions for the motor vehicle.

Thus, a technical advantage may be yielded in particular that parking positions, into which the motor vehicle may pull in, may be efficiently found. Thus, in an advantageous way, potential parking positions may be efficiently entered into a digital map.

In another specific embodiment, it is provided that the analysis includes that a dimension of a parking position is determined and is compared with a dimension of the motor vehicle, the parking position being determined only then as a potential parking position for the motor vehicle if the comparison revealed that the motor vehicle may pull into the parking position based on its dimension.

Thus, a technical advantage may be yielded; that is, it may be ensured that the motor vehicle fits into the parking position based on its dimension.

A dimension includes in particular a length and/or a width and/or a height of the motor vehicle. The dimension of the motor vehicle is generally known and is stored, for example, in a memory device in the motor vehicle itself. Within the scope of the analysis, it is then provided, for example, that the stored dimension of the motor vehicle is read out of the memory device.

According to one specific embodiment, it is provided that the analysis includes that a parking position is analyzed for whether the motor vehicle may autonomously pull into the parking position and/or autonomously pull out of the parking position, the parking position being determined only then as a potential parking position for the motor vehicle if the analysis revealed that the motor vehicle may autonomously pull into the parking position and/or autonomously pull out of the parking position.

Thus, a technical advantage may be yielded in particular that it may be efficiently ensured that the motor vehicle may autonomously pull into the parking position and may autonomously pull out of the parking position.

An autonomous pulling into or out of a parking position includes, in particular, a remote control of the motor vehicle in such a way that it pulls into the parking position and out of the parking position. An autonomous pulling into or out of a parking position includes, in particular, that the motor vehicle autonomously, i.e., independently, pulls into the parking position and autonomously pulls out of the parking position. This means that within the context of autonomous pulling into or out of a parking position, a driver no longer has to be present in the motor vehicle in order to manually guide the motor vehicle.

According to an autonomous driving function or driving control function, it may be provided that the motor vehicle may not carry out all physically possible driving maneuvers. Since, however, these functions are considered during the search for a potential parking position, the technical advantage is yielded in particular that the motor vehicle may also autonomously pull into the parking position and may autonomously pull out of the parking position.

For example, a parking assistant is provided which may autonomously pull the motor vehicle into the parking position or autonomously pull out of the parking position. The parking assistant has a specific parking function which specifies, for example, a maximum possible steering angle. For example, the function specifies a minimum distance that the motor vehicle must have with respect to objects in its surroundings so that the parking assistant may pull the motor vehicle into or out of the parking position. Thus, it may be ensured that the parking assistant may also provide its complete functionality.

According to one specific embodiment, it is provided that at least one route traveled by the motor vehicle during the trip is recorded from a predetermined starting position to a predetermined target position, ascertainment of the data including that at least one standard route is ascertained from the starting position to the target position based on the at least one recorded route, so that the ascertained data include the ascertained standard route.

Thus, a technical advantage may be yielded in particular that the motor vehicle may use an already known route to be driven by remote control within the parking facility or to autonomously drive within the parking facility.

Thus, it is generally normal within the scope of a parking procedure within a parking facility that the motor vehicle drives from a starting position to a target position. If this route is manually traveled at least once, then the motor vehicle subsequently knows where it is to drive along to arrive at the target position from the starting position.

According to one specific embodiment, the predetermined starting position is an entrance to the parking facility. The predetermined target position is, according to this specific embodiment, a potential parking position for the motor vehicle. Thus, a route for the motor vehicle is trained which leads from the entrance of the parking facility to a potential parking position.

According to another specific embodiment, it is provided that the predetermined starting position is a potential parking position for the motor vehicle. According to this embodiment, it is provided that the target position is an exit of the parking facility. Thus, it is provided according to this specific embodiment that a route for the motor vehicle is efficiently programmed which leads from a parking position to the exit of the parking facility.

According to one specific embodiment, multiple traveled routes from a respectively predetermined starting position to a respectively predetermined target position are recorded, a standard route from the corresponding starting position to the corresponding target position, based on the multiple recorded routes, being ascertained and entered into the digital map in each case.

This means, for example, that a route traveled by the motor vehicle during the trip from the entrance to the parking facility to a potential parking position for the motor vehicle is recorded. It is provided, for example, that a route traveled during the trip from a potential parking position for the motor vehicle to the exit of the parking facility is recorded.

Based on the standard routes, an AVP procedure is thus advantageously facilitated for the motor vehicle. "AVP" stands for "automatic valet parking" and may be referred to as "automatic parking procedure." Within the scope of an AVP procedure, it is provided, for example, that the motor vehicle automatically drives from the entrance of the parking facility to a potential parking position and automatically parks there. Within the scope of the AVP procedure, it is provided, for example, that the motor vehicle automatically drives from a parking position, at which the motor vehicle is parked, to the exit of the parking facility. An automatic driving operation includes, in particular, a remote control of the motor vehicle or autonomous driving operation of the motor vehicle. It is provided, for example, that the motor vehicle is remote controlled along one leg within the parking facility, the motor vehicle driving autonomously along another leg.

According to one specific embodiment, it is provided that a driver of the motor vehicle is prompted, with the aid of a human-machine interface, to situate an object of known dimensions within the parking facility so that during a detection of the object with the aid of the surroundings sensor system(s) during the trip by the motor vehicle within the parking facility, a dimension of the object is determined based on the detection and compared with the known dimension, it being determined depending on the comparison whether the surroundings sensor system(s) function(s) without error.

Thus, a technical advantage may be yielded in particular that it may be efficiently ensured that the surroundings sensor system functions without error. Since the object dimension is known, it may be checked whether the surroundings sensor system likewise recognizes the object dimension. A dimension refers here, as already explained in conjunction with the dimension of the motor vehicle, in particular to a length and/or a height and/or a width of the object.

According to one specific embodiment, it is provided that the ascertainment of the data includes an updating of data already present for an autonomous driving operation of the motor vehicle within the parking facility based on the surroundings data.

Thus, a technical advantage may be yielded in particular that, for example, an already present digital map of the parking facility may be efficiently updated.

In particular, a technical advantage may thus be yielded that already present data may be efficiently updated so that updated data are available for the autonomous driving operation of the motor vehicle.

Thus, it is provided, for example, that during multiple manually guided trips of the motor vehicle within the parking facility, the corresponding surroundings are detected in each case with the aid of the surroundings sensor system(s) to ascertain corresponding surroundings data. Thus, it may be efficiently provided in an advantageous way that an already present digital map (general data) may be more exactly compiled (or ascertained) by repeatedly driving in the parking facility.

According to one specific embodiment, it is provided that the system for ascertaining data for an autonomous driving operation of a motor vehicle is configured or designed to execute or to carry out the method for ascertaining data for an autonomous driving operation of a motor vehicle within a parking facility.

According to one specific embodiment, it is provided that the method for ascertaining data for an autonomous driving operation of a motor vehicle within a parking facility is executed or carried out with the aid of a system for ascertaining data for an autonomous driving operation.

According to one specific embodiment, it is provided that the motor vehicle is configured or designed to execute or carry out the method for ascertaining data for an autonomous driving operation of the motor vehicle within a parking facility.

According to one specific embodiment, a surroundings sensor system is provided for detecting present surroundings of the motor vehicle during a manually guided trip of the motor vehicle within the parking facility to ascertain surroundings data corresponding to the detected surroundings.

According to one specific embodiment, the motor vehicle includes one or multiple surroundings sensor system(s).

According to one specific embodiment, a human-machine interface is provided. The human-machine interface is designed, for example, to provide a driving instruction to the driver of the motor vehicle to once again detect surroundings of the motor vehicle. For example, the human-machine interface is designed to provide a prompt to a driver of the motor vehicle that the driver of the motor vehicle is to situate an object of known dimensions within the parking facility.

According to one specific embodiment, the system includes a human-machine interface.

According to one specific embodiment, the motor vehicle includes a human-machine interface.

The human-machine interface of the system respectively of the motor vehicle is, for example, the previously mentioned human-machine interface.

The expression "respectively" includes, in particular, the expression "and/or".

According to one specific embodiment, it is provided that the processing unit is designed to check, based on the surroundings data, whether the surroundings corresponding to the surroundings data have to be detected again with the aid of the surroundings sensor system(s), the processing unit being designed to ascertain a driving instruction for a driver of the motor vehicle to detect the surroundings once again with the aid of the surroundings sensor system(s) during a trip of the motor vehicle corresponding to the ascertained driving instruction if the check revealed that the surroundings corresponding to the surroundings data have to be detected once again with the aid of the surroundings sensor system(s), the processing unit being designed to provide the ascertained driving instruction to a human-machine interface so that the human-machine interface may provide the driving instruction to the driver of the motor vehicle.

According to one specific embodiment, it is provided that the processing unit is designed, with respect to ascertaining the data, to analyze the detected surroundings data for potential parking positions for the motor vehicle so that the ascertained data include located potential parking positions for the motor vehicle.

According to one specific embodiment, it is provided that the processing unit is designed, with respect to analyzing the data, to determine a dimension of a parking position and to compare it to a dimension of the motor vehicle, the processing unit being designed to only determine the parking position as a potential parking position for the motor vehicle if the comparison revealed that the motor vehicle may pull into the parking position based on its dimension.

According to one specific embodiment, it is provided that the processing unit is designed, with respect to analyzing a parking position, to analyze whether the motor vehicle may autonomously pull into the parking position and/or autonomously pull out of the parking position, the processing unit being designed to determine the parking position as a potential parking position for the motor vehicle only if the analysis revealed that the motor vehicle may autonomously pull into the parking position and/or autonomously pull out of the parking position.

According to one specific embodiment, it is provided that a recording device is provided which is designed to record at least one route traveled by the motor vehicle during the trip from a predetermined starting position to a predetermined target position, the processing unit being designed, with respect to ascertaining the data, to ascertain at least one standard route from the starting position to the target position based on the at least one recorded route, so that the ascertained data include the ascertained standard route.

According to one specific embodiment, it is provided that the predetermined starting position is an entrance to the parking facility and the predetermined target position is a potential parking position for the motor vehicle, and/or the predetermined starting position is a potential parking position for the motor vehicle and the predetermined target position is an exit of the parking facility.

According to one specific embodiment, it is provided that the processing unit is designed to ascertain and provide a prompt to a human-machine interface to situate an object of a known dimension within the parking facility, so that a driver of the motor vehicle may be prompted with the aid of the human-machine interface to situate an object of known dimension within the parking facility, the processing unit being designed to determine a dimension of the object based on the detection of the object during a detection of the object with the aid of the surroundings sensor system(s) during a trip by the motor vehicle within the parking facility, and to compare it with the known dimension, and, depending on the comparison, to determine whether the surroundings sensor system(s) function(s) without error.

According to one specific embodiment, it is provided that the processing unit is designed, with respect to ascertaining data, to update already present data for an autonomous driving operation of the motor vehicle within the parking facility based on the surroundings data.

According to one specific embodiment, it is provided that the surroundings sensor system(s) include(s) a surrounding sensor system of the motor vehicle and/or a surroundings sensor system of the parking facility.

According to one specific embodiment, it is provided that the processing unit is designed, with respect to ascertaining data, to ascertain a digital map of the parking facility and/or to ascertain setpoint trajectory data for a setpoint trajectory to be traveled by the motor vehicle within the parking facility.

The present invention is described below in greater detail by way of preferred exemplary embodiments.

DETAILED DESCRIPTION OF EXAMPLE EMBODIMENTS

Figure 1:
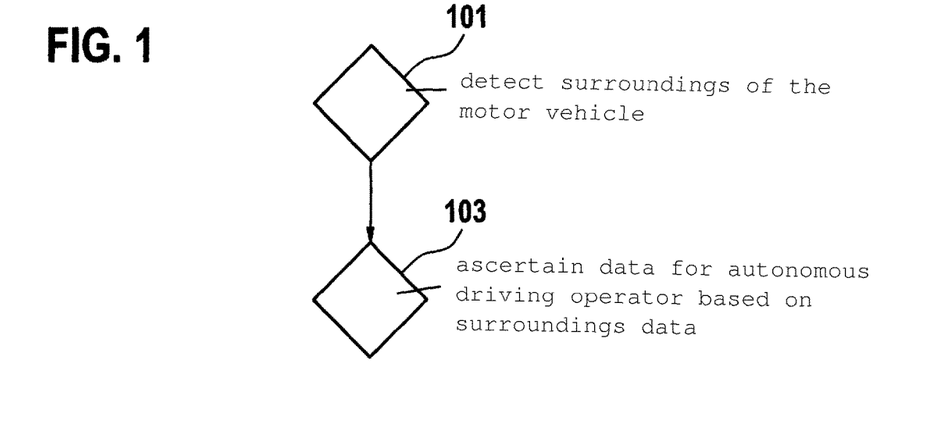
FIG. 1 shows a flow chart of a method for ascertaining data for an autonomous driving operation of a motor vehicle within a parking facility.

FIG. 1 shows a flow chart of a method for ascertaining data for an autonomous driving operation of a motor vehicle within a parking facility using one or multiple surroundings sensor system(s).

The method includes the following steps:

detecting 101 present surroundings of the motor vehicle during a manually-guided trip of the motor vehicle within the parking facility with the aid of the surroundings sensor system(s) to ascertain surroundings data corresponding to the detected surroundings, and ascertaining 103 the data for an autonomous driving operation of the motor vehicle within the parking facility based on the surroundings data so that the motor vehicle may autonomously drive within the parking facility based on the ascertained data.

By detecting the present surroundings of the motor vehicle, it is facilitated in an advantageous way to detect objects located in the surroundings of the motor vehicle. The compilation of the digital map of the parking facility includes, in particular, that the detected objects are plotted or entered into the digital map. For example, walls, columns, curbsides, and other stationary objects located within the parking facility, for example, stationary parking facility infrastructure elements, may be efficiently detected in an advantageous way with the aid of the surroundings sensor system and plotted or entered into the digital map of the parking facility.

Figure 2:
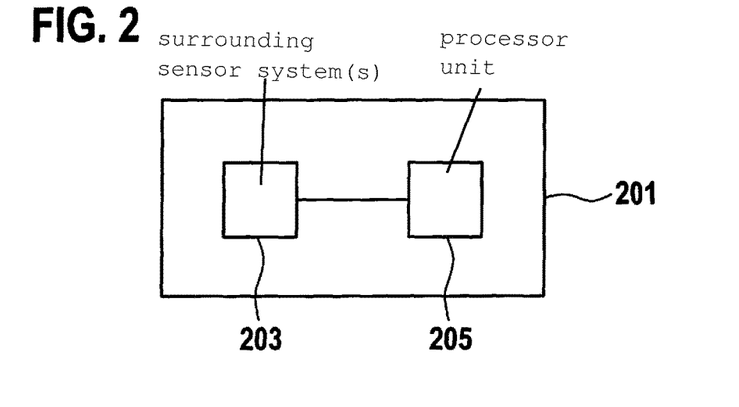
FIG. 2 shows a system for ascertaining data for an autonomous driving operation of a motor vehicle within a parking facility using one or multiple surroundings sensor system(s).

FIG. 2 shows a system 201 for ascertaining data for an autonomous driving operation of a motor vehicle within a parking facility using one or multiple surroundings sensor system(s).

System 201 includes:

one or multiple surroundings sensor system(s) 203 for detecting present surroundings of the motor vehicle during a manually-guided trip of the motor vehicle within the parking facility to ascertain surroundings data corresponding to the detected surroundings, and a processing unit 205 for ascertaining the data for an autonomous driving operation of the motor vehicle within the parking facility based on the surroundings data, so that the motor vehicle may drive autonomously within the parking facility based on the ascertained data.

The rectangle with reference numeral 203 shown in FIG. 2 is to stand symbolically for one surroundings sensor system or for multiple surroundings sensor systems.

For example, it is provided that a surroundings sensor system of the motor vehicle and a surroundings sensor system of the parking facility are included in multiple surroundings sensor systems 203 so that both a surroundings sensor system of the motor vehicle and a surroundings sensor system of the parking facility detect present surroundings of the motor vehicle during a manually-guided trip of the motor vehicle within the parking facility to ascertain surroundings data corresponding to the detected surroundings.

System 201 includes, for example, a human-machine interface.

Figure 3:
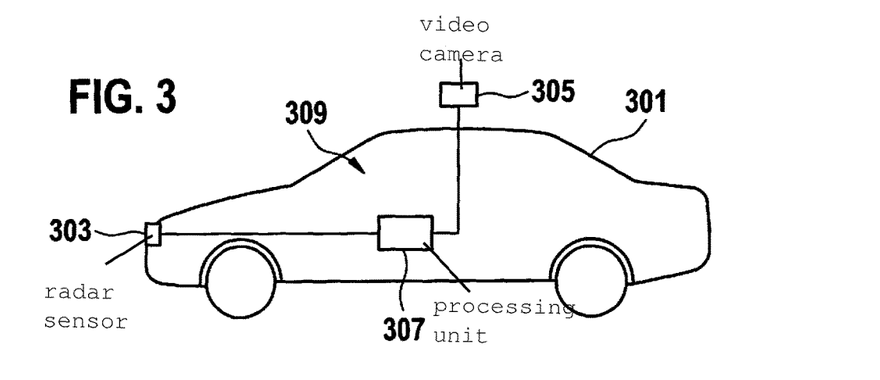
FIG. 3 shows a motor vehicle.

FIG. 3 shows a motor vehicle 301.

Motor vehicle 301 includes a radar sensor 303 which is attached on a front side of motor vehicle 301. Motor vehicle 301 further includes a video sensor 305 in the form of a video camera which is attached on a roof of motor vehicle 301. Video camera 305 and radar sensor 303 detect corresponding surroundings of the motor vehicle during a manually guided trip of motor vehicle 301 within a parking facility. Based on the detected surroundings, corresponding surroundings data are ascertained. These surroundings data are provided to a processing unit 307 of motor vehicle 301. Processing unit 307 compiles a digital map of the parking facility based on the surroundings data.

Thus, motor vehicle 301 includes a system 309 for ascertaining data for an autonomous driving operation of a motor vehicle 301 within a parking facility using one or multiple surroundings sensor system(s), system 309 including the two sensors 303, 305 as surroundings sensor systems and processing unit 307.

Figure 4:
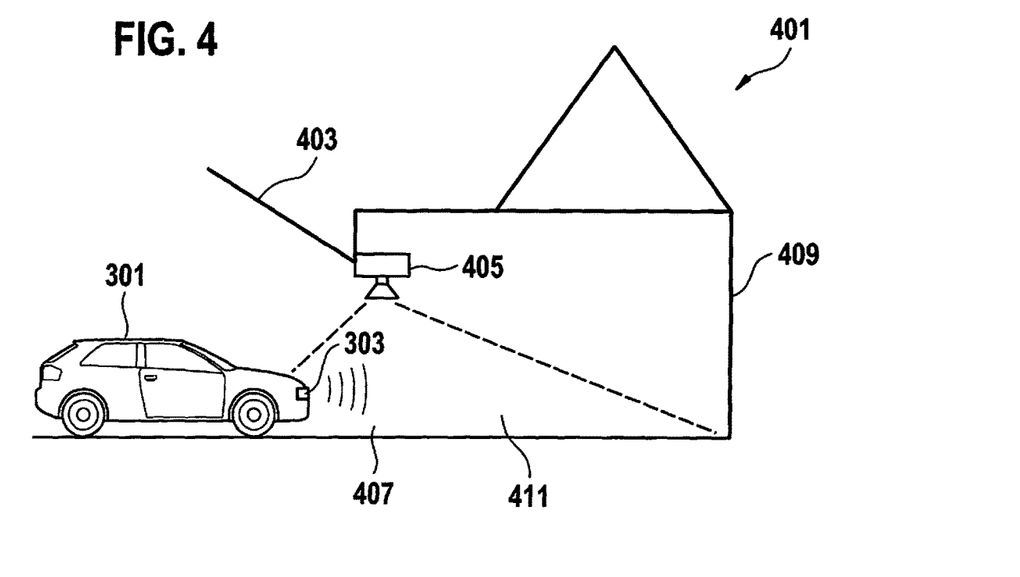
FIGS. 4 through 6 each show a parking facility.

FIG. 4 shows motor vehicle 301 from FIG. 3 during a manually guided trip within a parking facility 401. For the sake of clarity, only sensor 303 from system 309 of motor vehicle 301 from FIG. 3 is shown in FIG. 4 and also in FIGS. 5 and 6, not, however, additional elements 305, 307 of system 309.

Parking facility 401 is designed as a parking garage including a garage door 403. A video camera 405 is situated in an entrance area 407 of parking garage 401. A corresponding detection angle of video camera 405 is provided with reference numeral 411. One end of the parking garage is provided with reference numeral 409.

Motor vehicle 301 may thus be monitored in an advantageous way with the aid of video camera 405. Motor vehicle 301 drives manually within parking facility 401 and compiles, as previously stated, a digital map (general data for an autonomous or driverless driving of the motor vehicle) of parking facility 401. After such a compilation of a digital map, motor vehicle 301 may drive autonomously or by remote control in an advantageous way within parking facility 401 based on the compiled digital map. In particular, motor vehicle 301 may carry out an automatic parking operation within parking facility 401 based on the compiled digital map.

Figure 5:
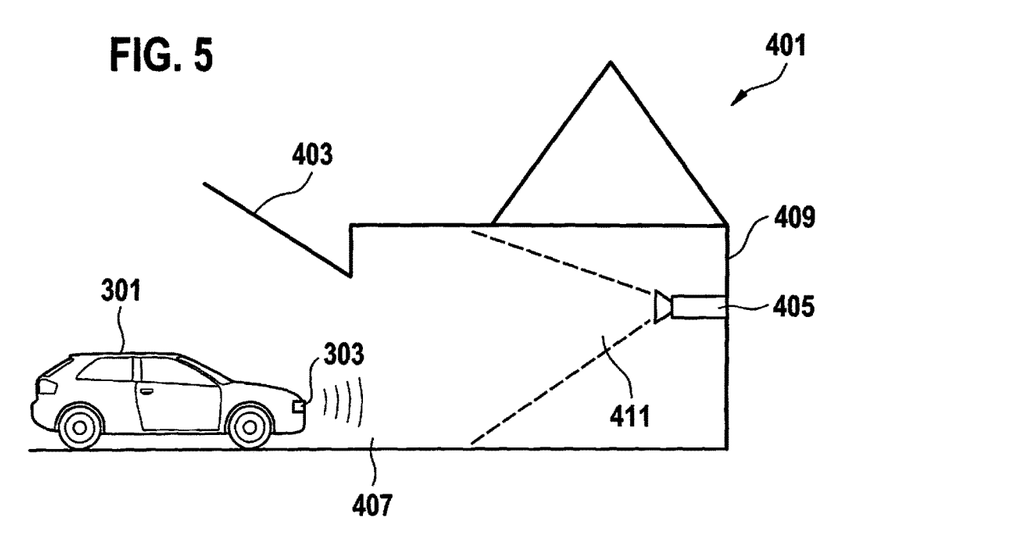

FIG. 5 shows an additional possible configuration of parking facility 401. In contrast to the configuration shown in FIG. 4, video camera 405 is not situated in entrance area 407, but instead at end 409 of parking facility 401.

Figure 6:
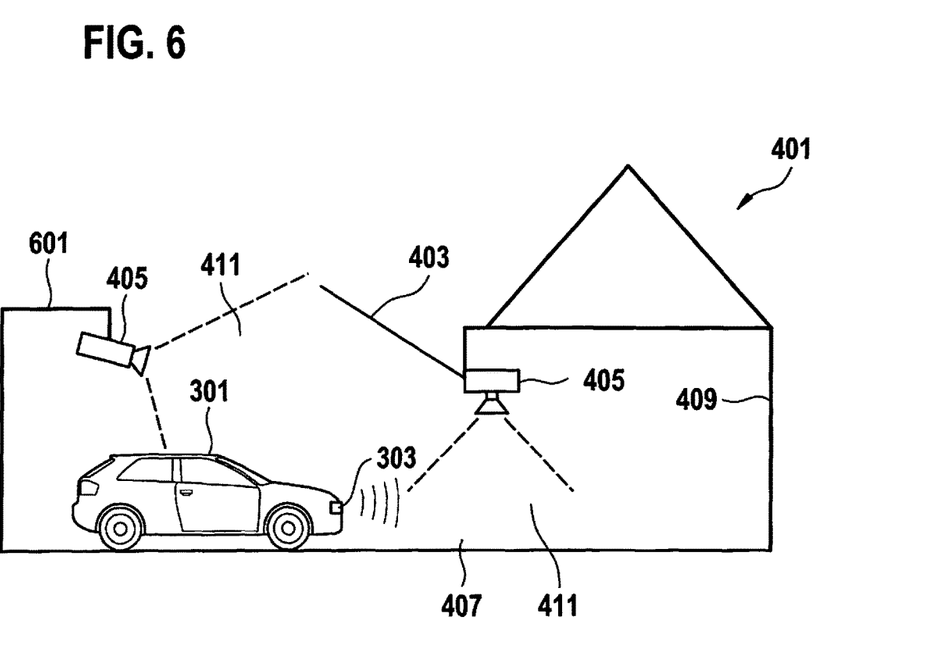

FIG. 6 shows the parking facility according to the configuration according to FIG. 4, another video camera 405 being additionally provided outside of parking garage 401, situated on a pole 601 and may detect and correspondingly monitor motor vehicle 301 during its trip outside of parking facility 401.

Parking facility 401 shown in FIGS. 4 through 6 includes, according to one specific embodiment, system 201 from FIG. 2. The surroundings sensor system of parking facility 401 thus includes, for example, video camera 405 or video cameras 405. Thus, it is facilitated in an advantageous way that even if a motor vehicle drives within parking facility 401, which does not include system 201 from FIG. 2, data may be ascertained for this motor vehicle, based on which the motor vehicle may autonomously drive within parking facility 401. This means that, according to this specific embodiment, it is provided that data are ascertained with the aid of parking facility 401 using system 201.

In another specific embodiment, it is provided that data are ascertained with the aid of both system 201 of motor vehicle 301 and with the aid of system 201 of parking facility 401, based on which motor vehicle 301 may autonomously drive within parking facility 401. These data, which were ascertained respectively by the individual systems 201, are then, for example, merged or synchronized with one another.

In another specific embodiment, it is provided that both a surroundings sensor system of motor vehicle 301 and a surroundings sensor system 405 of parking facility 401 detect a manually-guided trip of motor vehicle 301, whereby corresponding surroundings data are ascertained, the data then being ascertained for the autonomous driving operation of motor vehicle 301 based on the surroundings data.

The present invention includes in particular and among other things the idea to provide a technical and efficient concept, based on which data for an autonomous driving operation of a motor vehicle within a parking facility may be efficiently ascertained using one or multiple surroundings sensor system(s). For example, it is provided according to one specific embodiment that a digital map of the parking facility is compiled based on the ascertained data. Based on such a digital map, the motor vehicle may then carry out an automatic parking procedure within the parking facility in an advantageous way.

An underlying idea according to the present invention is particularly to be seen in that the trajectories necessary for such an AVP procedure are programmed. For this purpose, it is provided, according to one specific embodiment, that a route, which the motor vehicle travels during its trip is recorded, this route leading from a starting position to a target position, a standard route being ascertained based on the recorded route and being entered into the digital map. Subsequently, the motor vehicle may travel the standard route itself in an advantageous way.

If necessary, the motor vehicle itself detects present obstacles (for example, a bicycle) in subsequent trips with the aid of the surroundings sensor system. According to one specific embodiment, it is provided that the motor vehicle automatically stalls at detected problems, i.e., automatically stops.

According to a specific embodiment, it is provided that the trip of the motor vehicle, in particular the trip of the motor vehicle within the scope of an AVP procedure is monitored with the aid of the driver, who may then intervene if necessary. This means that the driver may represent a redundant safety function.

The driver may thereby remain seated, for example, in the driver's seat. The driver may, for example, be located outside of the motor vehicle according to one specific embodiment and may monitor, and if necessary stop, the function and his motor vehicle via a mobile terminal, for example, a mobile telephone.

This means that to compile the digital map of the parking facility, the driver of the motor vehicle initially manually drives his motor vehicle through the parking facility and appropriately trains it.

Both the manually guided trip of the motor vehicle within the parking facility and a remote-controlled or autonomous trip of the motor vehicle within the parking facility are monitored according to another specific embodiment. For example, with the aid of a vehicle external monitoring system, which may include, for example, one or multiple surroundings sensor(s), in particular video cameras.

Thus, for example, the monitoring system (which corresponds to the surroundings sensor system of the parking facility), monitors a trip of the motor vehicle from an entrance of the parking facility to a parking position and/or vice versa.

It is provided in particular that multiple video cameras or multiple surroundings sensors are situated within the parking facility so that a longer path of the motor vehicle within the parking facility may be efficiently monitored.

The surroundings sensors of the monitoring system are, for example, the previously mentioned surroundings sensors, as they have been described in conjunction with the surroundings sensor system.

According to one specific embodiment, multiple routes or trajectories for different target positions, i.e., in particular for different possible parking positions, are ascertained or generated.

According to one specific embodiment, the driver of the motor vehicle is prompted before starting an AVP procedure to select one from various target positions and/or various routes. In one specific embodiment, one target position and/or one route is proposed to the driver of the motor vehicle for selection from the various possibilities.

In another specific embodiment, one target position and/or one route is automatically selected from the various possibilities.

In another specific embodiment, it is analyzed before an AVP procedure whether a planned route is free of obstacles. This, in particular, with the aid of the vehicle external monitoring device. If a path or a route is not clear, then the driver is automatically prompted to clear the path. For example, he has to put away a bicycle.

In another specific embodiment, at a recognized problem during a trip of the motor vehicle, in particular during an AVP procedure, the motor vehicle stops automatically. This, for example, if an analysis has determined that a new object is located in the driving path of the motor vehicle. In another specific embodiment, a detected problem and a stopping of the motor vehicle are communicated to the driver, for example, via a communication network, for example, via his or her mobile terminal.

According to another specific embodiment, the motor vehicle is stopped and switched off automatically at its target position.

Switching off means here, in particular, that a drive engine of the motor vehicle is switched off. Switching off means, in particular, that additional electrical systems of the motor vehicle are stopped or switched off. Switching off means, in particular, that doors and a trunk of the motor vehicle are closed or locked.

In another specific embodiment, a conclusion of an AVP procedure is communicated to the driver.

In another specific embodiment, the manual and/or automatically carried out trips of the motor vehicle within the parking facility are analyzed. If, for example, it is determined that the motor vehicle always drives very close to an object at a specific point, and there is a lot of space on another side, then this is considered during future trips. This is, for example, communicated to the driver according to one specific embodiment. The driver may, for example, thus generate a new trajectory in an advantageous way. This, for example, with the aid of a manually guided trip.

In another specific embodiment, based on the trajectories or routes and the analyses, an improved trajectory is ascertained and is proposed to the driver as an addition and/or as a substitution.

In another specific embodiment, regularly and/or after problems, it is checked whether the system, in particular the vehicle external system, in particular the used surroundings sensor systems, functions respectively function properly, i.e., without error. This includes, in particular, the check whether the monitoring system, for example the surroundings sensor system, still detects objects in the visual field. For this purpose, for example, the driver is prompted to set up specific objects with known dimensions at specific locations within the parking facility. These are then analyzed and checked whether a correct analysis is still present. If deviations are ascertained, then an additional implementation of the method is denied, the system is thus blocked, and the driver is prompted to ameliorate this problem.

For example, the driver is prompted to notify a repair service.

In another specific embodiment, the check includes a ride with a person.

The trip of the motor vehicle includes, in particular, a trip from an entrance of the parking facility to a parking position and vice versa.

What is claimed is:

1. A method for ascertaining data for an autonomous driving operation of a motor vehicle within a parking facility using one or multiple surroundings sensor system(s), comprising:
    detecting present surroundings of the motor vehicle during a manually-guided trip of the motor vehicle within the parking facility with the aid of the surroundings sensor system(s) to ascertain surroundings data corresponding to the surroundings;
    ascertaining the data for an autonomous driving operation of the motor vehicle within the parking facility based on the surroundings data so that the motor vehicle may autonomously drive within the parking facility based on the ascertained data;
    checking, based on the surroundings data, whether the surroundings corresponding to the surroundings data have to be detected again with the aid of the surroundings sensor system(s); and
    ascertaining, if the check reveals that the surroundings corresponding to the surroundings data have to be detected again with the aid of the surroundings sensor system(s), a driving instruction for a driver of the motor vehicle to detect the surroundings again with the aid of the surroundings sensor system(s) during a trip of the motor vehicle corresponding to the ascertained driving instruction, the driving instruction being provided to the driver of the motor vehicle with the aid of a human-machine interface;
    wherein the ascertainment of the data includes: i) compiling a digital map of the parking facility, and ii) ascertaining setpoint trajectory data of a setpoint trajectory to be traveled by the motor vehicle within the parking facility, and
    wherein the motor vehicle includes a radar sensor, which is attached on a front side of the motor vehicle, and a video sensor on a roof of motor vehicle, wherein the video sensor and the radar sensor detect corresponding surroundings of the motor vehicle during a manually guided trip of motor vehicle within the parking facility, and wherein based on the detected surroundings, corresponding surroundings data are ascertained and provided to a processing unit of the motor vehicle, and wherein the processing unit compiles the digital map of the parking facility based on the surroundings data.

2. The method as recited in claim 1, wherein the ascertaining of the data includes analyzing the ascertained surroundings data for potential parking positions for the motor vehicle so that the ascertained data include located potential parking positions for the motor vehicle.

3. The method as recited in claim 2, wherein the analyzing includes determining a dimension of a parking position and comparing the determined dimension to a dimension of the motor vehicle, the parking position being determined as a potential parking position for the motor vehicle only if the comparison reveals that the motor vehicle may pull into the parking position based on the dimension of the motor vehicle.

4. The method as recited in claim 2, wherein the analyzing includes analyzing a parking position as to whether the motor vehicle may at least one of: i) autonomously pull into the parking position, and ii) autonomously pull out of the parking position, the parking position being determined as a potential parking position for the motor vehicle if the analysis reveals that the motor vehicle at least one of may autonomously pull into the parking position and may autonomously pull out of the parking position.

5. The method as recited in claim 1, wherein at least one route from a predetermined starting position to a predetermined target position, traveled by the motor vehicle during the trip, is recorded, the ascertainment of the data including that, based on the at least one recorded route, at least one standard route is ascertained from the starting position to the target position so that the ascertained data include the ascertained standard route.

6. The method as recited in claim 5, wherein at least one of: i) the predetermined starting position is an entrance of the parking facility and the predetermined target position is a potential parking position for the motor vehicle, and ii) the predetermined starting position is a potential parking position for the motor vehicle and the predetermined target position is an exit of the parking facility.

7. The method as recited in claim 1, wherein, with the aid of a human-machine interface, a driver of the motor vehicle is prompted to situate an object of known dimension within the parking facility so that during a detection of the object with the aid of the surroundings sensor system(s) during a trip of the motor vehicle within the parking facility, a dimension of the object is determined based on the detection and compared with the known dimension, it being determined depending on the comparison whether the surroundings sensor system(s) function(s) without error.

8. The method as recited in claim 1, wherein the ascertainment of the data includes an updating of already present data for an autonomous driving operation of the motor vehicle within the parking facility based on the surroundings data.

9. The method as recited in claim 1, wherein the surroundings sensor system(s) includes at least one of: i) a surroundings sensor system of the motor vehicle, and ii) a surroundings sensor system of the parking facility.

10. The method as recited in claim 1, wherein a trip of the motor vehicle, within the scope of an automatic valet parking (AVP) procedure is monitored with the aid of the driver, can intervene within the vehicle or remotely from the vehicle, so as to provide a redundant safety function.

11. The method as recited in claim 1, wherein a trip of the motor vehicle, within the scope of an automatic valet parking (AVP) procedure is monitored with the aid of the driver, can intervene within the vehicle or remotely from the vehicle, so as to provide a redundant safety function, and wherein the driver monitors and if necessary stops the function and his motor vehicle via a mobile terminal or a mobile telephone.

12. A system for ascertaining data for an autonomous driving operation of a motor vehicle within a parking facility using one or multiple surroundings sensor system(s), comprising:
    one or more surroundings sensor system(s) for detecting present surroundings of the motor vehicle during a manually guided trip of the motor vehicle within the parking facility to ascertain surroundings data corresponding to the detected surroundings; and a processing unit for ascertaining the data for an autonomous driving operation of the motor vehicle within the parking facility based on the surroundings data, so that the motor vehicle may autonomously drive within the parking facility based on the ascertained data;

wherein the processing unit is configured to check, based on the surroundings data, whether the surroundings corresponding to the surroundings data have to be detected again with the aid of the surroundings sensor system(s); and wherein the processing unit is configured to ascertain, if the check reveals that the surroundings corresponding to the surroundings data have to be detected again with the aid of the surroundings sensor system(s), a driving instruction for a driver of the motor vehicle to detect the surroundings again with the aid of the surroundings sensor system(s) during a trip of the motor vehicle corresponding to the ascertained driving instruction, the driving instruction being provided to the driver of the motor vehicle with the aid of a human-machine interface, and wherein the processing unit is configured, with respect to ascertaining data, to perform the following: i) ascertain a digital map of the parking facility, and ii) ascertain setpoint trajectory data of a setpoint trajectory to be traveled by the motor vehicle within the parking facility, and wherein the motor vehicle includes a radar sensor, which is attached on a front side of the motor vehicle, and a video sensor on a roof of motor vehicle, wherein the video sensor and the radar sensor detect corresponding surroundings of the motor vehicle during a manually guided trip of motor vehicle within the parking facility, and wherein based on the detected surroundings, corresponding surroundings data are ascertained and provided to a processing unit of the motor vehicle, and wherein the processing unit compiles the digital map of the parking facility based on the surroundings data.

13. The system as recited in claim 12, wherein the processing unit is configured, with respect to ascertaining the data, to analyze the ascertained surroundings data for potential parking positions for the motor vehicle so that the ascertained data include located potential parking positions for the motor vehicle.

14. The system as recited in claim 13, wherein the processing unit is configured, with respect to analyzing the data, to determine a dimension of a parking position and to compare the determined dimension to a dimension of the motor vehicle, the processing unit being configured to determine the parking position as a potential parking position for the motor vehicle only if the comparison reveals that the motor vehicle may pull into the parking position based on the dimension of the motor vehicle.

15. The system as recited in claim 13, wherein the processing unit is configured, with respect to analyzing a parking position, to analyze whether the motor vehicle may at least one of: i) autonomously pull into the parking position, and ii) autonomously pull out of the parking position, the processing unit being configured to determine the parking position as a potential parking position for the motor vehicle only if the analysis revealed that the motor vehicle may at least one of autonomously pull into the parking position and autonomously pull out of the parking position.

16. The system as recited in claim 12, further comprising:
a recording device which is configured to record at least one route traveled by the motor vehicle during the trip from a predetermined starting position to a predetermined target position, the processing unit being configured, with respect to ascertaining the data, to ascertain at least one standard route from the starting position to the target position based on the at least one recorded route so that the ascertained data include the ascertained standard route.

17. The system as recited in claim 16, wherein at least one of: i) the predetermined starting position is an entrance of the parking facility and the predetermined target position is a potential parking position for the motor vehicle, and ii) the predetermined starting position is a potential parking position for the motor vehicle and the predetermined target position is an exit of the parking facility.

18. The system as recited in claim 12, wherein the processing unit is configured to ascertain a prompt to situate an object of a known dimension within the parking facility and to provide the prompt to a human-machine interface so that with the aid of the human-machine interface, a driver of the motor vehicle may be prompted to situate an object of a known dimension within the parking facility, the processing unit being configured, upon detecting the object with the aid of the surroundings sensor system(s) during the trip of the motor vehicle within the parking facility, to determine a dimension of the object based on the detection of the object and to compare the determined dimension to the known dimension and to determine, depending on the comparison, whether the surroundings sensor system(s) function(s) without error.

19. The system as recited in claim 12, wherein the processing unit is configured, with respect to ascertaining data, to update already present data for an autonomous driving operation of the motor vehicle within the parking facility based on the surroundings data.

20. The system as recited in claim 12, wherein the surroundings sensor system(s) include(s) at least one of: i) a surroundings sensor system of the motor vehicle, and ii) a surroundings sensor system of the parking facility.

21. A motor vehicle, comprising:
a system for ascertaining data for an autonomous driving operation of a motor vehicle within a parking facility using one or multiple surroundings sensor system(s), including:
one or more surroundings sensor system(s) for detecting present surroundings of the motor vehicle during a manually guided trip of the motor vehicle within the parking facility to ascertain surroundings data corresponding to the detected surroundings; and
a processing unit for ascertaining the data for an autonomous driving operation of the motor vehicle within the parking facility based on the surroundings data, so that the motor vehicle may autonomously drive within the parking facility based on the ascertained data;
wherein the processing unit is configured to check, based on the surroundings data, whether the surroundings corresponding to the surroundings data have to be detected again with the aid of the surroundings sensor system(s); and
wherein the processing unit is configured to ascertain, if the check reveals that the surroundings corresponding to the surroundings data have to be detected again with the aid of the surroundings sensor system(s), a driving instruction for a driver of the motor vehicle to detect the surroundings again with the aid of the surroundings sensor system(s) during a trip of the motor vehicle corresponding to the ascertained driving instruction, the driving instruction being provided to the driver of the motor vehicle with the aid of a human-machine interface, and wherein the processing unit is configured, with respect to ascertaining data, to perform the following: i) ascertain a digital map of the parking facility, and ii) ascertain setpoint trajectory data of a setpoint trajectory to be traveled by the motor vehicle within the parking, and wherein the motor vehicle includes a radar sensor, which is attached on a front side of the motor vehicle, and a video sensor on a roof of motor vehicle, wherein the video sensor and the radar sensor detect corresponding surroundings of the motor vehicle during a manually guided trip of motor vehicle within the parking facility, and wherein based on the detected surroundings, corresponding surroundings data are ascertained and provided to a processing unit of the motor vehicle, and wherein the processing unit compiles the digital map of the parking facility based on the surroundings data.

22. A parking facility for a motor vehicle, comprising:
a system for ascertaining data for an autonomous driving operation of a motor vehicle within a parking facility using one or multiple surroundings sensor system(s), including:
   one or more surroundings sensor system(s) for detecting present surroundings of the motor vehicle during a manually guided trip of the motor vehicle within the parking facility to ascertain surroundings data corresponding to the detected surroundings; and
   a processing unit for ascertaining the data for an autonomous driving operation of the motor vehicle within the parking facility based on the surroundings data, so that the motor vehicle may autonomously drive within the parking facility based on the ascertained data;
   wherein the processing unit is configured to check, based on the surroundings data, whether the surroundings corresponding to the surroundings data have to be detected again with the aid of the surroundings sensor system(s); and
   wherein the processing unit is configured to ascertain, if the check reveals that the surroundings corresponding to the surroundings data have to be detected again with the aid of the surroundings sensor system(s), a driving instruction for a driver of the motor vehicle to detect the surroundings again with the aid of the surroundings sensor system(s) during a trip of the motor vehicle corresponding to the ascertained driving instruction, the driving instruction being provided to the driver of the motor vehicle with the aid of a human-machine interface, and
   wherein the processing unit is configured, with respect to ascertaining data, to perform the following: i) ascertain a digital map of the parking facility, and ii) ascertain setpoint trajectory data of a setpoint trajectory to be traveled by the motor vehicle within the parking, and
   wherein the motor vehicle includes a radar sensor, which is attached on a front side of the motor vehicle, and a video sensor on a roof of motor vehicle, wherein the video sensor and the radar sensor detect corresponding surroundings of the motor vehicle during a manually guided trip of motor vehicle within the parking facility, and wherein based on the detected surroundings, corresponding surroundings data are ascertained and provided to a processing unit of the motor vehicle, and wherein the processing unit compiles the digital map of the parking facility based on the surroundings data.

23. A non-transitory computer-readable storage medium on which is stored a computer program, which is executable by a processor, comprising:
   a program code arrangement having program code for ascertaining data for an autonomous driving operation of a motor vehicle within a parking facility using one or multiple surroundings sensor system(s), by performing the following:
   detecting present surroundings of the motor vehicle during a manually-guided trip of the motor vehicle within the parking facility with the aid of the surroundings sensor system(s) to ascertain surroundings data corresponding to the surroundings; and
   ascertaining the data for an autonomous driving operation of the motor vehicle within the parking facility based on the surroundings data so that the motor vehicle may autonomously drive within the parking facility based on the ascertained data;
   checking, based on the surroundings data, whether the surroundings corresponding to the surroundings data have to be detected again with the aid of the surroundings sensor system(s); and
   ascertaining, if the check reveals that the surroundings corresponding to the surroundings data have to be detected again with the aid of the surroundings sensor system(s), a driving instruction for a driver of the motor vehicle to detect the surroundings again with the aid of the surroundings sensor system(s) during a trip of the motor vehicle corresponding to the ascertained driving instruction, the driving instruction being provided to the driver of the motor vehicle with the aid of a human-machine interface;
   wherein the ascertainment of the data includes: i) compiling a digital map of the parking facility, and ii) ascertaining setpoint trajectory data of a setpoint trajectory to be traveled by the motor vehicle within the parking facility, and
   wherein the motor vehicle includes a radar sensor, which is attached on a front side of the motor vehicle, and a video sensor on a roof of motor vehicle, wherein the video sensor and the radar sensor detect corresponding surroundings of the motor vehicle during a manually guided trip of motor vehicle within the parking facility, and wherein based on the detected surroundings, corresponding surroundings data are ascertained and provided to a processing unit of the motor vehicle, and wherein the processing unit compiles the digital map of the parking facility based on the surroundings data.

* * * * *